Aug. 14, 1962   R. J. GILSON   3,049,132
WASHING MACHINE
Filed April 4, 1958   13 Sheets-Sheet 3
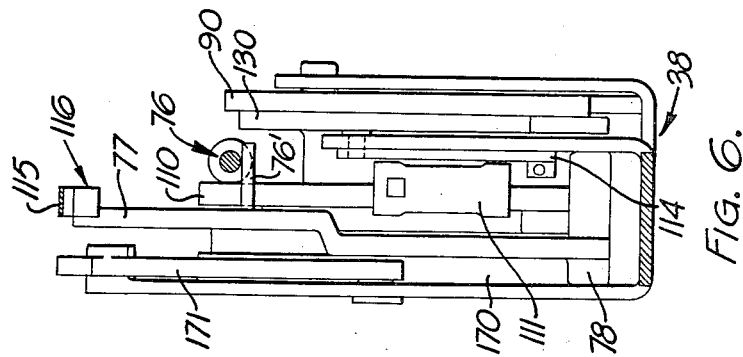
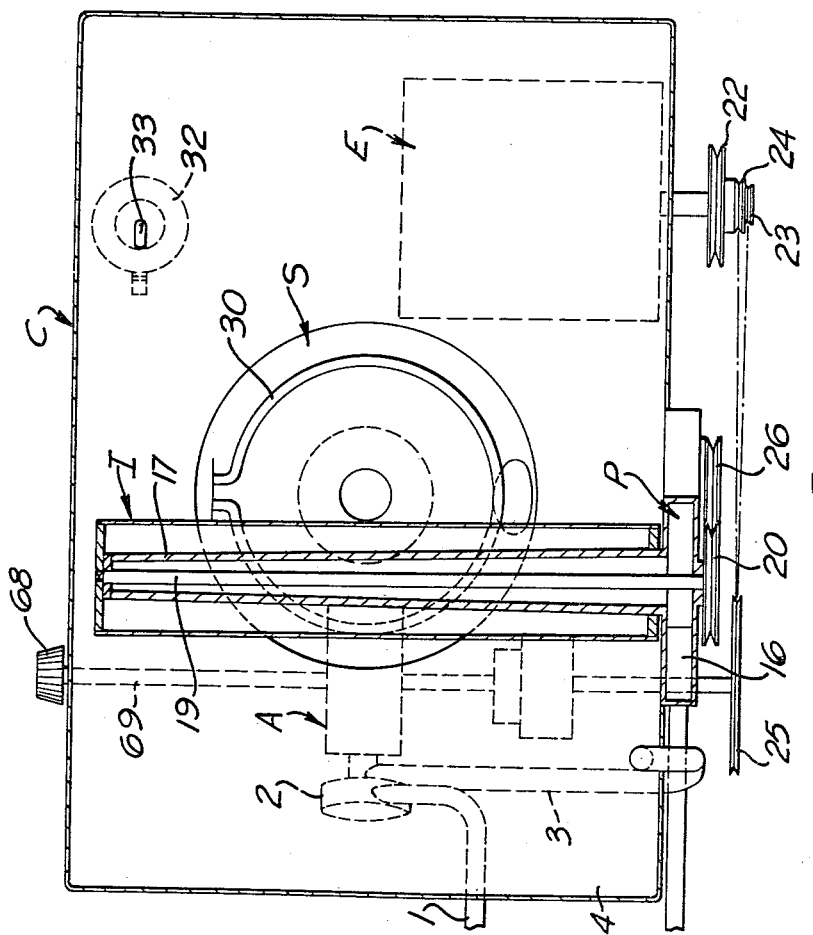
Inventor:
Robert John Gilson
By his attorneys
Baldwin & Wight

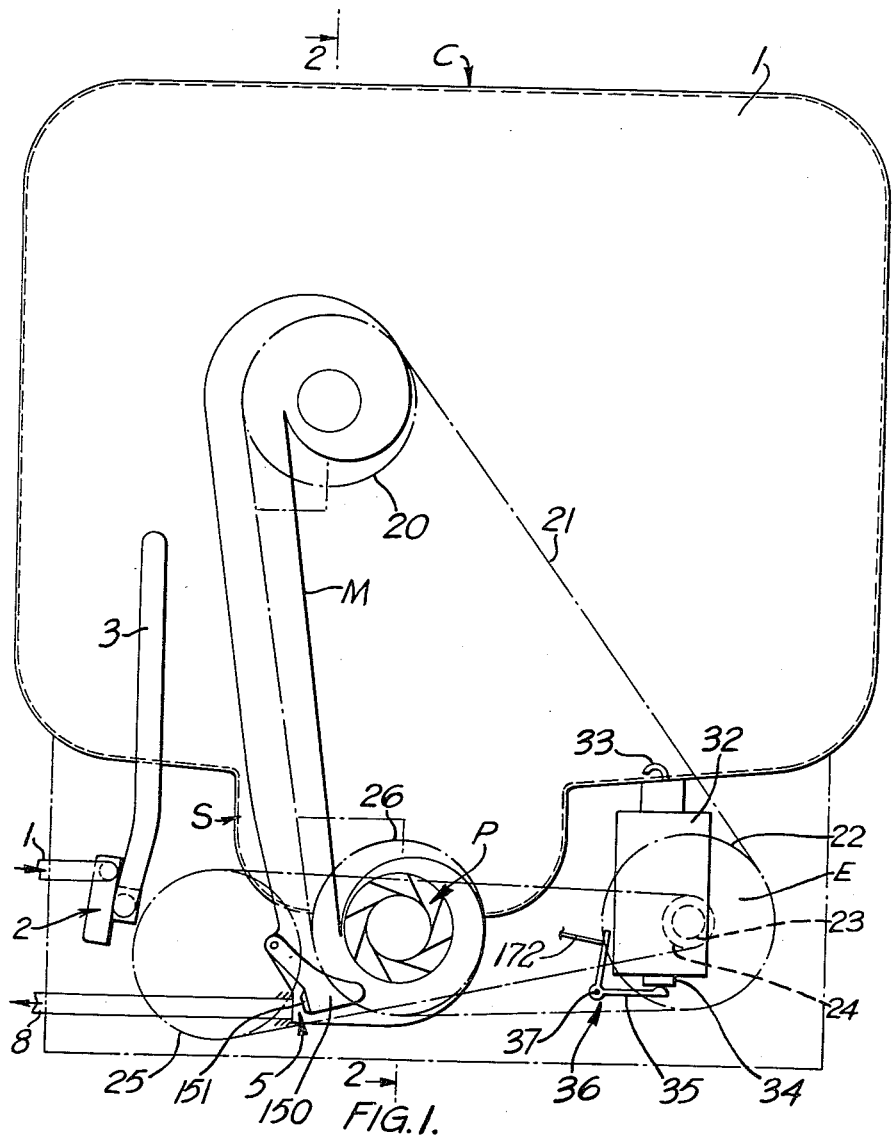

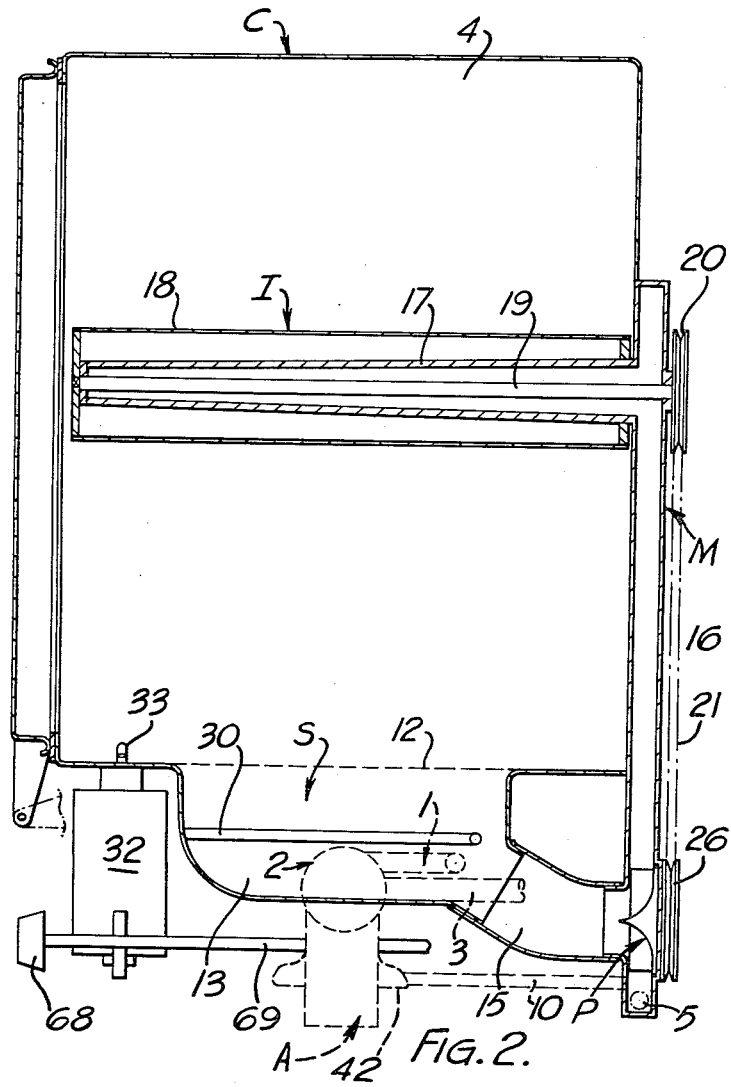

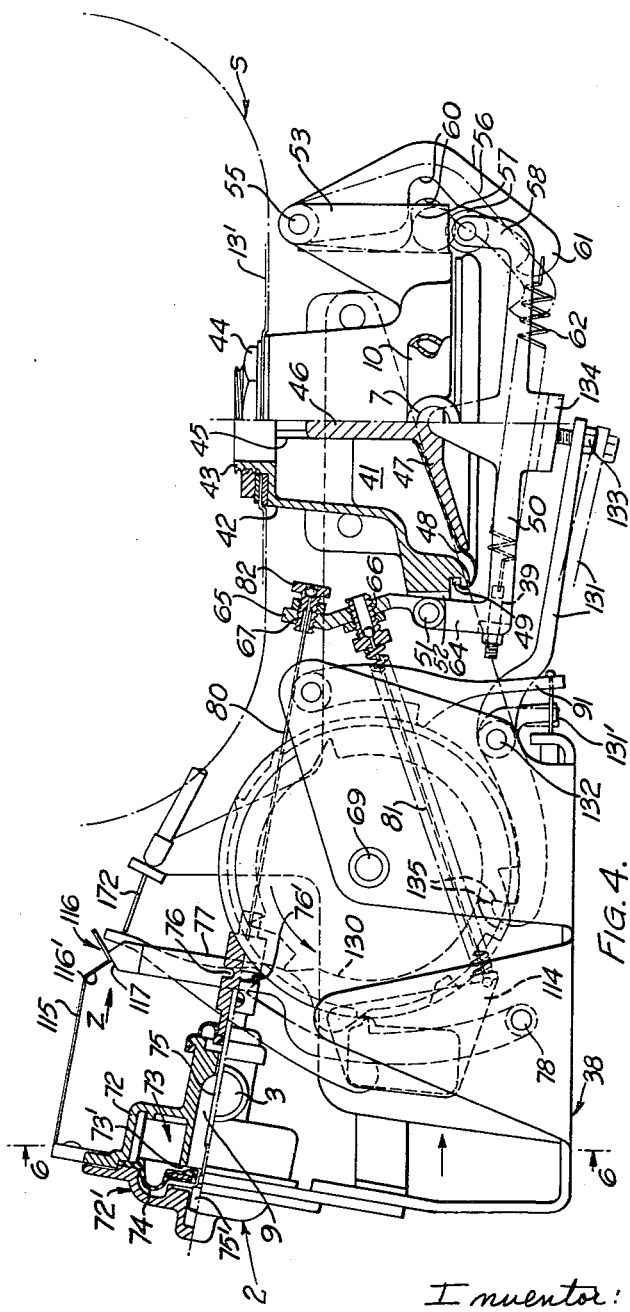

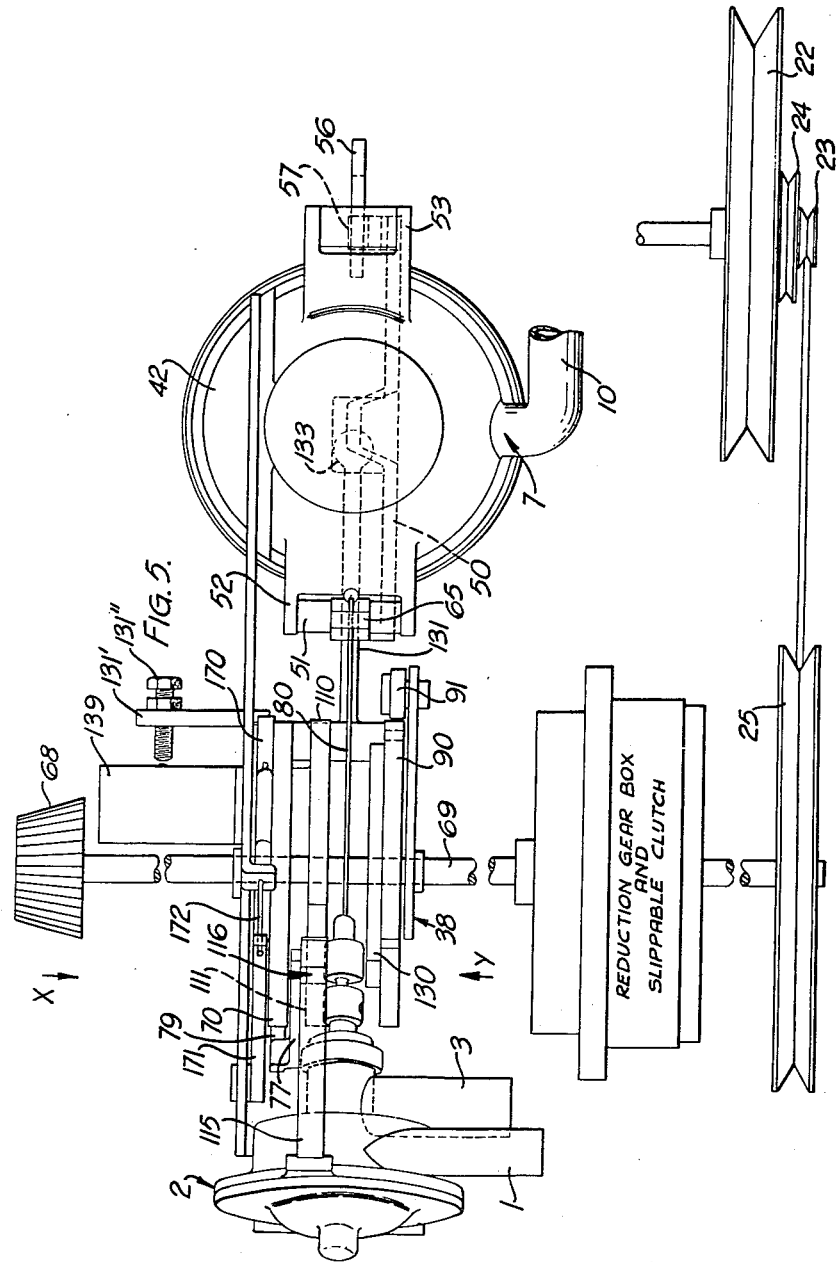

Aug. 14, 1962   R. J. GILSON   3,049,132
WASHING MACHINE
Filed April 4, 1958   13 Sheets-Sheet 9

Inventor:
Robert John Gilson
By his attorneys:
Baldwin & Wight

Aug. 14, 1962   R. J. GILSON   3,049,132
WASHING MACHINE
Filed April 4, 1958   13 Sheets-Sheet 12

Inventor:
Robert John Gilson
By his attorneys:
Baldwin & Wight

Aug. 14, 1962 R. J. GILSON 3,049,132
WASHING MACHINE
Filed April 4, 1958 13 Sheets-Sheet 13

Inventor:
Robert John Gilson
By his attorneys:
Baldwin & Wight

United States Patent Office 3,049,132
Patented Aug. 14, 1962

3,049,132
WASHING MACHINE
Robert John Gilson, New Malden, England, assignor to Charles Colston Limited, a corporation of the United Kingdom
Filed Apr. 4, 1958, Ser. No. 726,394
Claims priority, application Great Britain Apr. 5, 1957
13 Claims. (Cl. 134—57)

This invention relates to dish and like washing machines intended primarily for domestic purposes.

It is customary in a dishwashing machine which operates in accordance with a timed sequence of operations, for the filling of the machine, with either washing or rinsing water, to be under the control of a solenoid-operated valve. This solenoid-operated valve is arranged to be open for such a time that, with reasonably constant rate of water supply, the machine fills with the desired amount of water which effectively performs the washing or rinsing operation.

However, since the pressure of the water supply may at times be low, or since the valves may become partially-choked, the machine may not become filled with the necessary amount of water during the time the valve is open. Consequently, the washing and rinsing operations may not be performed as efficiently as is desired.

The main object of the present invention is to provide a washing machine which when started up, is capable of performing a predetermined washing cycle and which will automatically stop itself should there be insufficient water in the system and re-start only when sufficient water has entered and which will also ensure that washing and/or rinsing times are adequate despite any interruption in the supply of water to the machine.

Another object of the invention is to provide a machine which can be used in conjunction either with a cold or hot water supply by incorporating an electric heater for heating the water to a suitable temperature.

Another object of the invention is to provide means for varying the overall time of the washing cycle so that the user can readily adjust the machine to give a normal or long wash.

A further object of the invention is the provision of an inlet valve designed to require small actuating forces and movements over the wide range of supply pressures.

Still another object of the invention is the provision of means for introducing an additive compound, e.g. a detergent to the washing liquid.

According to the present invention, a washing machine comprises a washing chamber, an inlet to said chamber for connection with a washing liquid supply and provided with an inlet valve to control admission of liquid to said chamber, a liquid discharge outlet, a valve for controlling the discharge of liquid through said outlet, a spraying device within the washing chamber, power operated means to operate the spraying device and means which becomes operative on starting up the power operated means to open the inlet valve to admit liquid to the chamber and means responsive to pressure set up by the head of liquid in the washing chamber for closing or permitting closing of said inlet valve when a predetermined amount of washing liquid is present in said chamber.

A further feature of the invention comprises the provision of a power unit which is set into operation on commencement of a washing cycle and a control means including control elements operatively connected to the power unit or to a part driven therefrom, and connections between said elements and the inlet and outlet valves respectively whereby the latter are automatically actuated to conform to a predetermined washing cycle.

Another feature of the invention where the machine is powered by an electric motor comprises a control element for actuating a start and stop switch in the motor circuit and a manual control means for moving the control element to close the switch and start a washing cycle.

Means may also be provided for temporarily stopping or disengaging the power drive to the control elements in the event of there being an insufficient quantity of washing liquid present in the system and of restarting or re-engaging the drive as soon as the correct amount of liquid is present.

Conveniently the start and stop switch is utilized to open the electric motor circuit and thus arrest the power drive.

According to another feature of the invention an electric heater is provided for heating the liquid in the washing chamber the heater being so arranged that it only comes into operation when the correct amount of liquid is present in the system.

The invention is illustrated in the accompanying drawings in which:

FIGURE 1 is an elevation of a dish-washing machine in accordance with one embodiment of the invention;

FIGURE 2 is a sectional view on the lines 2—2 of FIGURE 1 and FIGURE 3 a sectional plan view;

FIGURE 4 is a sectional elevation and

FIGURE 5 is a plan view respectively of the cam control mechanism as shown in FIGURE 4;

Figure 7:
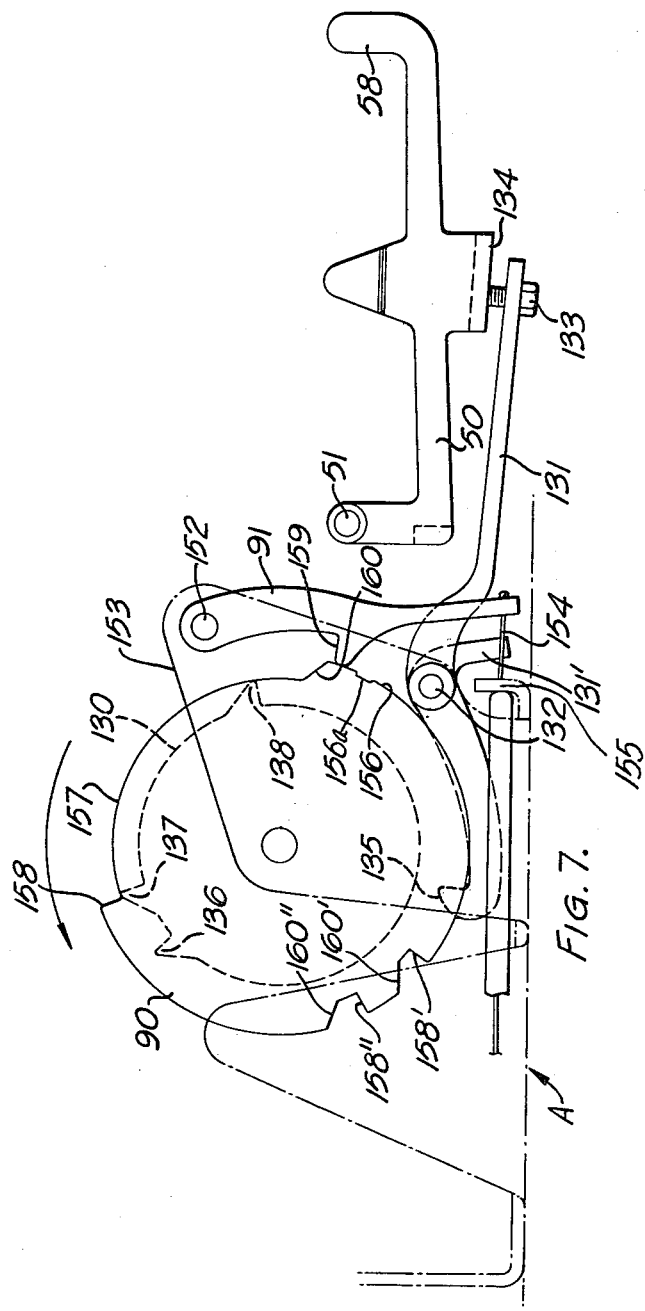
Figure 8:
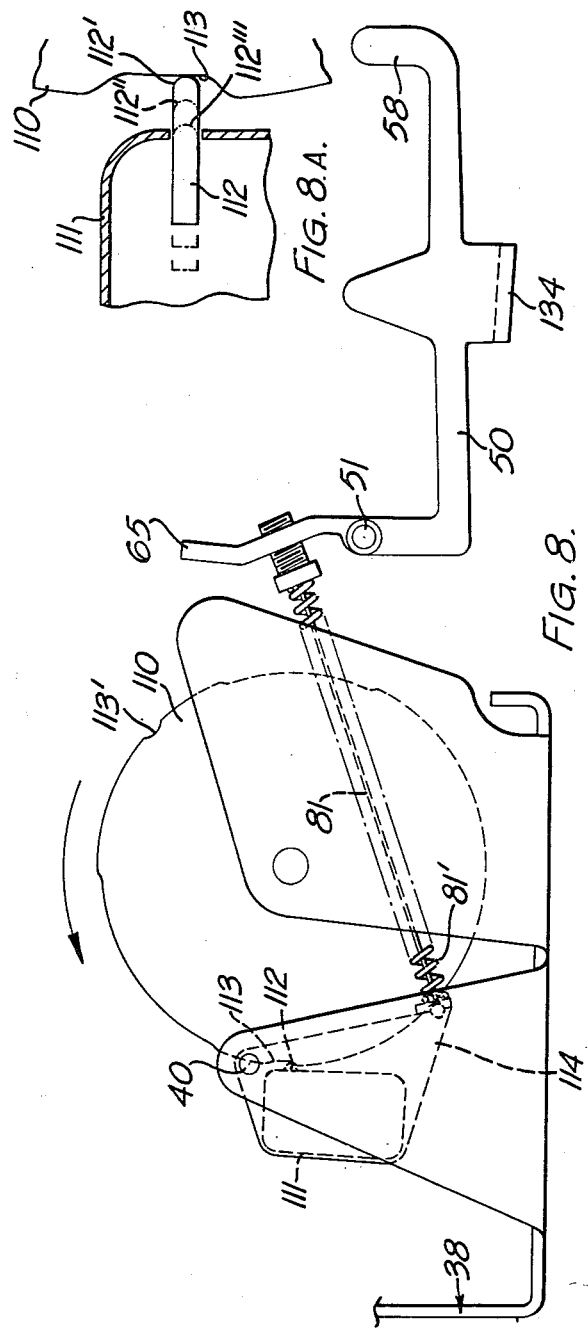
Figure 9:
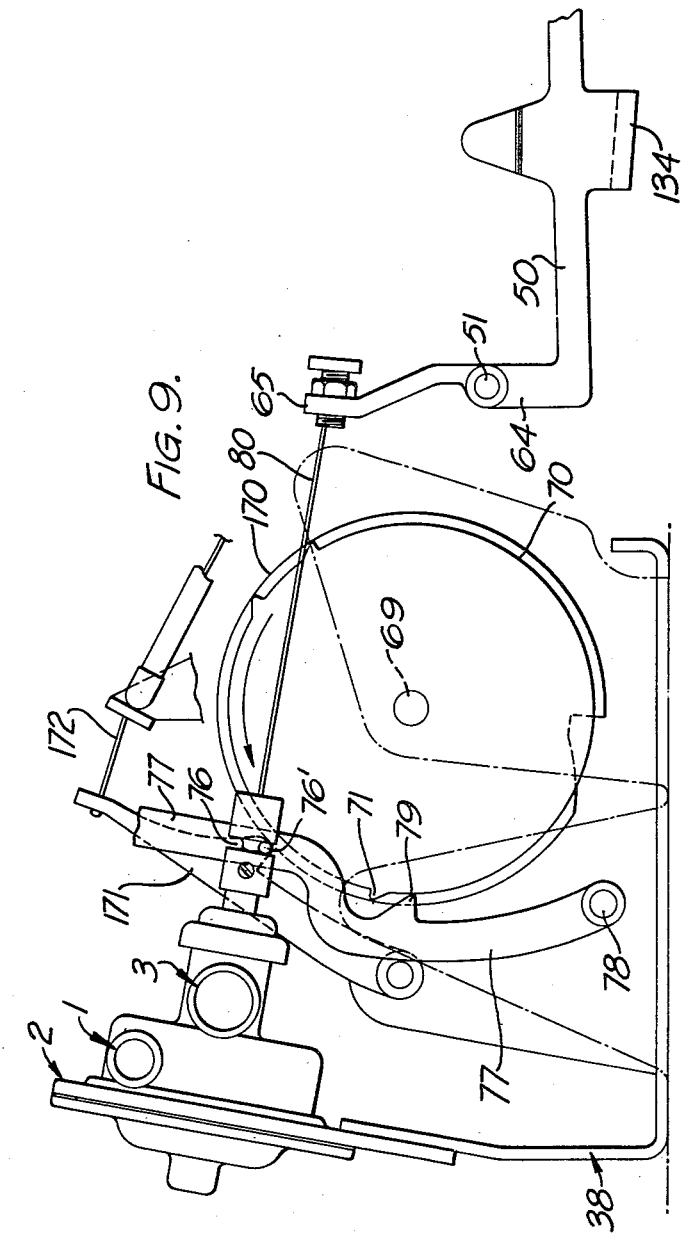
Figure 10:
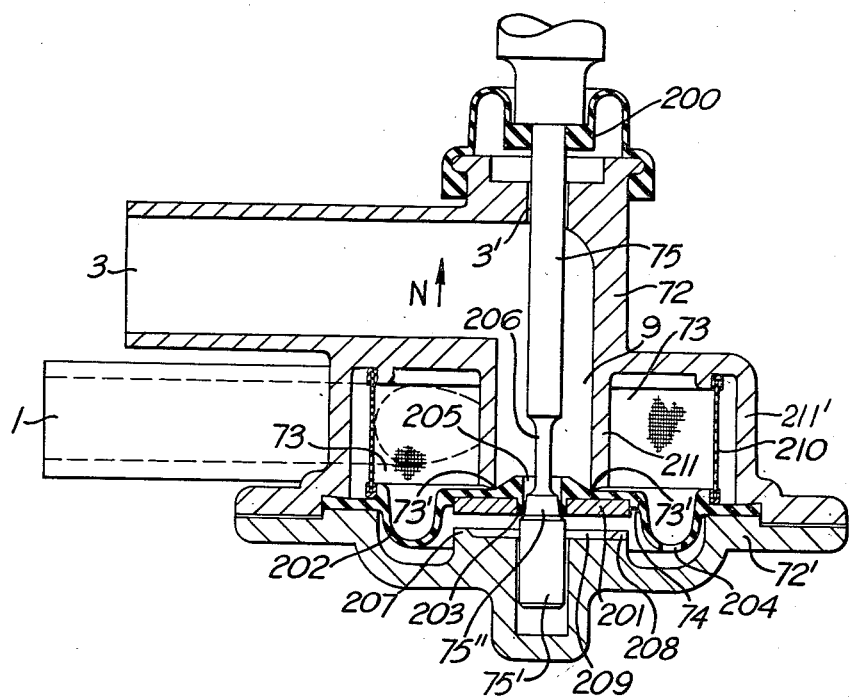
Figure 11:
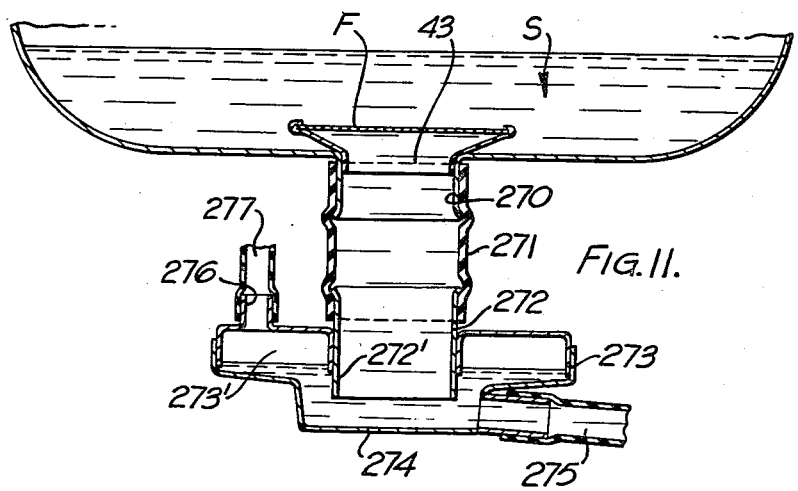
Figure 12:
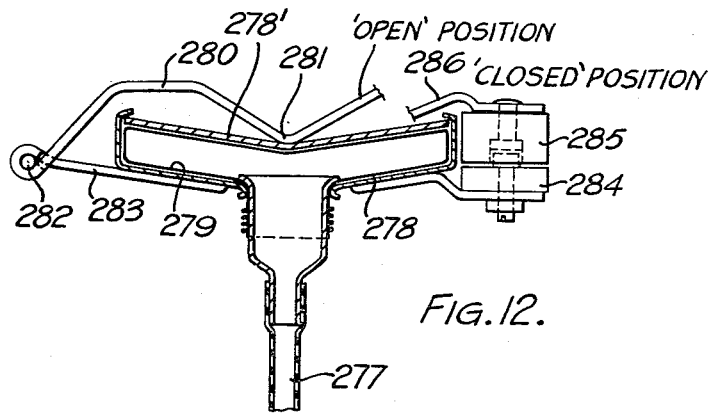
Figure 13:
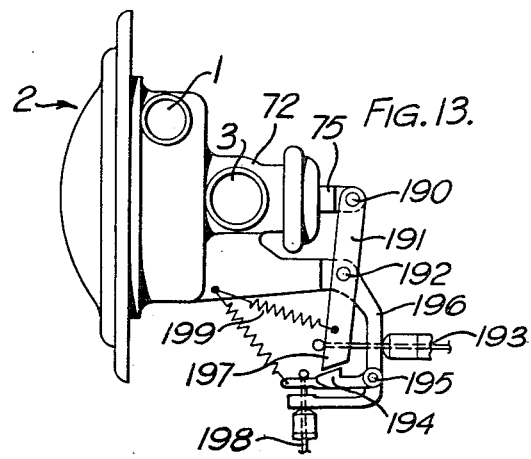
Figure 14:
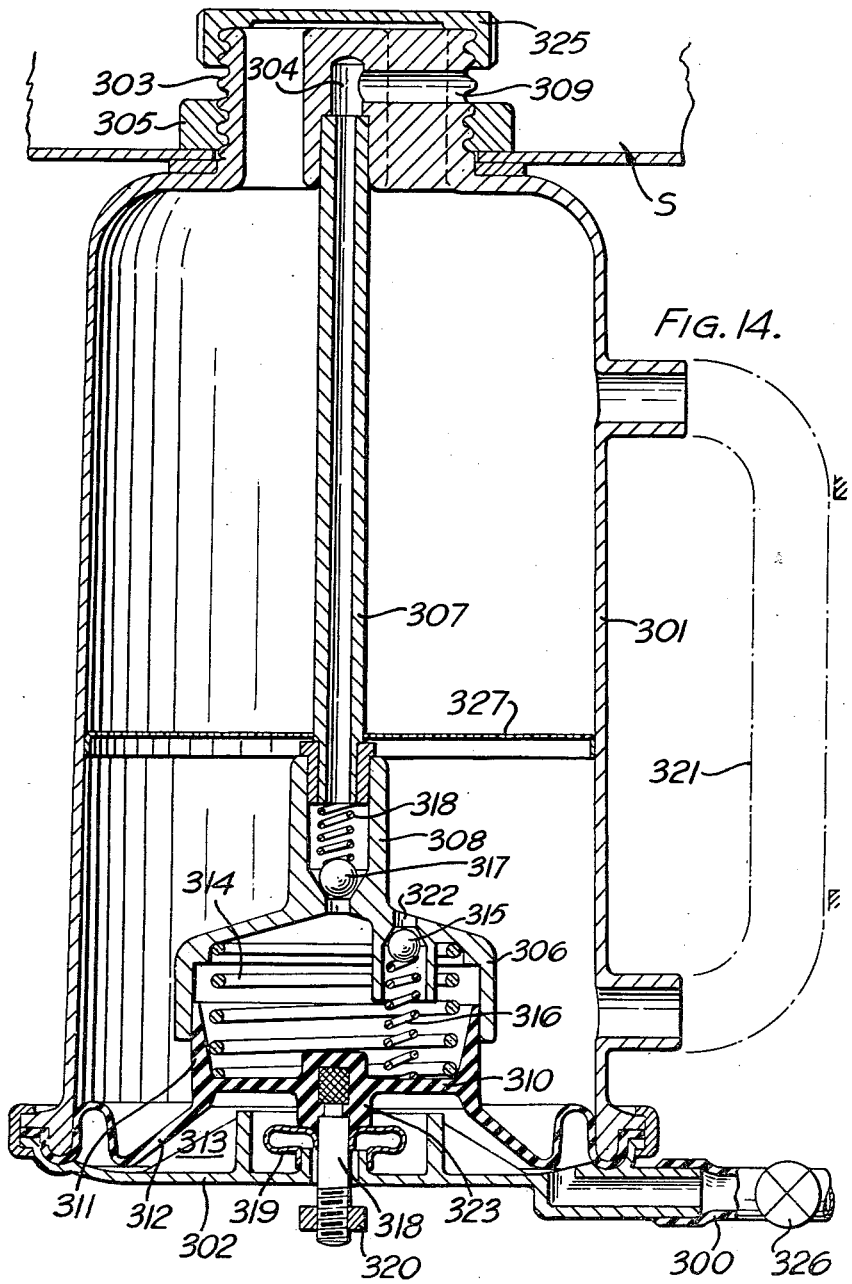

FIGURE 6 being a fragmentary sectional view on the lines 6—6 of FIGURE 4;

FIGURES 7, 8 and 9 are part views in elevation of the several control cams;

FIGURE 8A is a detail view of a motor switch and control cam;

FIGURE 10 is a sectional elevation on an enlarged scale of the inlet valve;

FIGURES 11, 12 and 13 show a modified arrangement of the control system;

FIGURE 11 being a detail section of the sump to the washing chamber;

FIGURE 12 a section of the actuating mechanism including an actuator lever and pressure responsive member by which it is operated;

FIGURE 13 is a detail elevation showing a modified form of water inlet control valve; and FIGURE 14 is a detail sectional elevation showing one form of additive dispenser.

Figure 15:
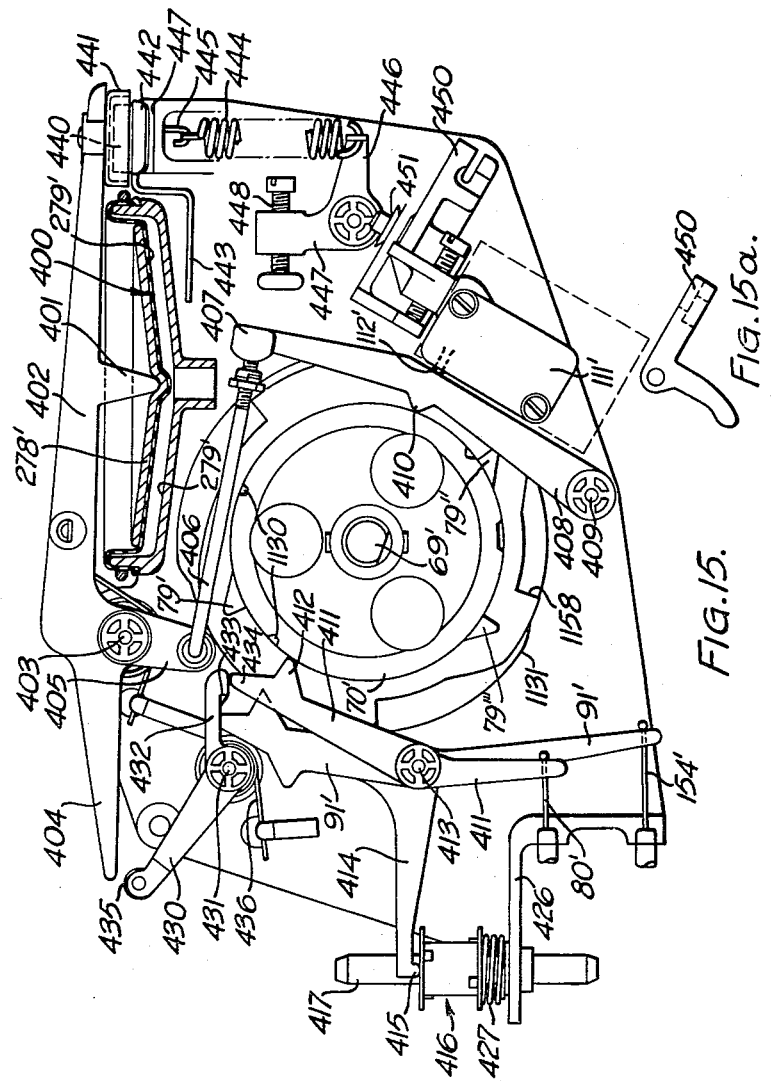
Figure 16:
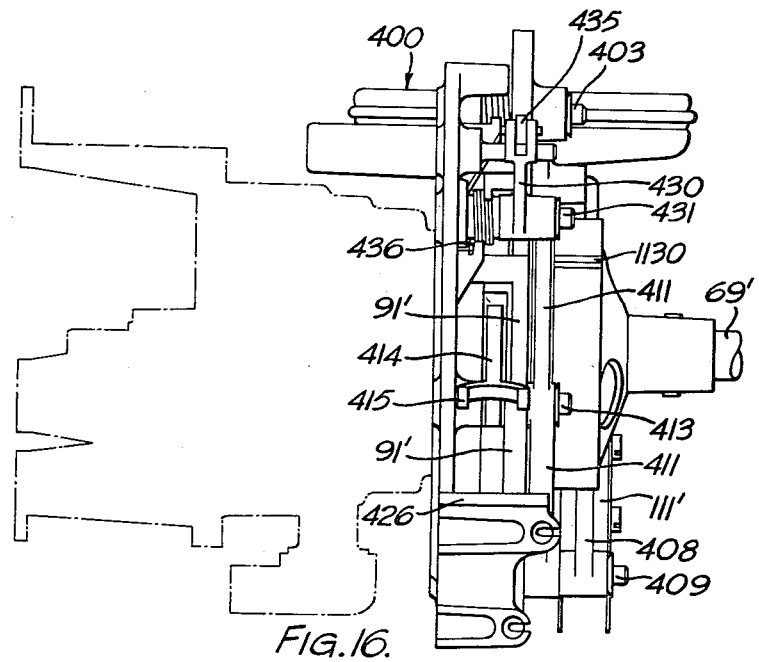
Figure 17:
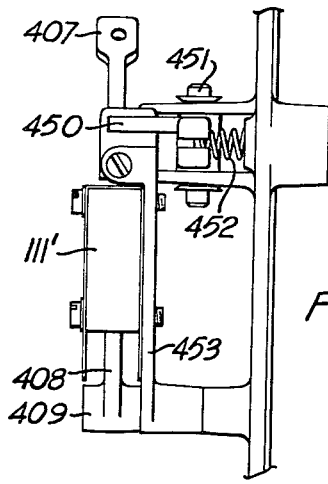
Figure 18:
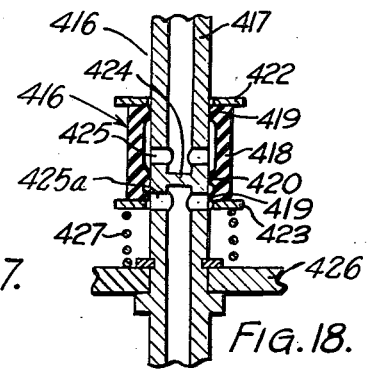

FIGURES 15 and 16 are respectively a diagrammatic sectional elevation and side view of a modified arrangement of the control system. FIGURE 15A is a detail view of a motor switch biasing lever. FIGURE 17 is a detail view showing the interlocking mechanism between the motor switch and the cabinet door and FIGURE 18 is a diagrammatic sectional elevation of one form of valve suitable for use as the dispenser operating valve.

In the drawings there is shown a washing chamber C having an impeller I to which the washing liquid, hereinafter referred to as water, is supplied through a manifold M by means of a pump P, the pump P drawing from a sump S in the bottom of the chamber C. The construction and operation of the impeller I and water circulation system is the subject of the co-pending application of Alfred Henry Wickham and Robert John Gilson, Serial No. 810,883, filed May 4, 1959 as a continuation-in-part of their application Serial No. 629,124, filed December 18, 1956. Drive to the impeller I is from suitable power operated means, as shown an electric motor E and may be by belt and pulley as shown, the motor E also providing the motive force for a control cam unit, indicated generally at A, by which the filling and draining of the washing chamber with water is performed in timed sequences.

Water is fed to the washing chamber C from a pipe 1 which is coupled to a water main or other source of supply and thence through an inlet control valve 2 from which a pipe 3 opens into the interior 4 of the chamber C. The outlet or main drain from the chamber C consists of a pipe 8 connecting with the bottom of the manifold M, in which is a valve 5, which normally remains closed.

A chamber 42, for the purpose hereinafter described, is attached to the sump, this chamber 42 having an outlet 7, from which leads a pipe 10 to the manifold M to provide means whereby the chamber 42 may be completely drained and also to provide a back pressure from the manifold to the chamber when the pump is operating.

The sump S beneath the washing chamber 4 is separated from the latter by a filter 12 (FIGURE 2), the water passing from the space 13 beneath the filter through a pipe 15 which connects to the pump P so that during the washing operation, the water will be continuously circulated from the sump via the interior passage 16 of the manifold M to the interior of a distribution pipe 17 on which an impeller cylinder indicated at 18 is mounted to revolve.

*Motor Drive*

Drive to the impeller is by means of a shaft 19 on the outer end of which is fastened a pulley 20, the pulley 20 being coupled by a belt drive 21 to a pulley 22 fastened on the output shaft of the motor E.

On the output shaft of the motor are also small and large size pulleys 23, 24 by which drive is transmitted to a pulley 25 (see also FIGURE 5) by which the control cam unit A is operated as hereinafter described. It will be obvious that the overall cycle time for the washing, rinsing and drying periods may be varied by connecting one or other of the two pulleys 23, 24 to pulley 25. Alternatively any type of adjustable pulley drive may be used instead of the two-step pulley 23—24.

Drive to the pump P is obtained by carrying the drive belt from the motor pulley 22 over the impeller shaft pulley 20 to a third pulley 26 fast on the pump shaft.

To enable the machine to operate as efficiently either with a hot or cold water supply and to maintain the desired washing temperature irrespective of the size of the wash there is provided means for heating the water within the washing chamber or sump. Mounted within the sump S is an electrical heater unit in the form of a resistance element 30, the control and operation of which will hereinafter be described.

To assist in the washing operation a detergent or wetting agent solution may be added to the washing or rinsing liquid and for this purpose there is provided externally of and beneath the washing chamber C a container 32, such solution being fed from container 32 to the interior space 4 of the chamber C through a dispensing nozzle 33, by means of a plunger 34 projecting from the underside of the container which may be depressed by hand, but in the preferred embodiment is mechanically operated by means of one arm 35 of a two armed lever 36 mounted for rocking movement about a fulcrum 37.

Alternatively the dispenser control lever 36 may operate a valve in a pipe coupled to a compressed air supply from an air bottle generated by means of the pressure in the manifold M. The compressed air when the valve is open is used to operate a plunger within the container 32 to force liquid from the container.

Referring now to FIGURE 14, there is shown one such arrangement together with an alternative construction of additive dispenser. The dispenser which comprises a container 301 for the additive e.g. a wetting agent to be dispensed, is supported by the lower wall of the sump S of the washing chamber, and is formed for this purpose with a screwed neck 303 which passes through an opening in the sump wall and is secured to the sump casing by means of a nut 305.

Within the lower part of the container 301 is a bell shaped casing 306 which in conjunction with a piston element 310 provides a pump device for forcing liquid from the container 301 to the interior of the sump S.

The piston element 310 which may be formed of flexible material comprises a lower skirt portion 312 by which it is flexibly secured to the casing 301 by means of the end plate 302 of the container so that the piston as a whole is capable of up and down movement in relation to the casing 306, the latter having a spigotted end 308 by which it is connected through a central pipe 307 to the neck 303. At its upper end the pipe 307 opens into a counterbore 304 from which extends a lateral duct 309 opening into the interior of the sump S. The piston element 310 includes an upper skirt 311 which is a sliding fit within the casing 306 and within the casing is a coil spring 314 by which the piston is urged in a downwards direction to the position shown in the drawing.

Flow of liquid from the interior of the container 301 to the interior of pump casing 306 is controlled by a self-closing ball valve 315 which is maintained against its seating by a spring 316. Similarly the out-flow of liquid from the interior of the casing 306 is by means of a self-closing second ball valve 317, maintained against its seating by a spring 318.

It will be seen that the lower skirt 312 of the piston element 310 encloses an interior space 313 into which opens a pipe 300, the pipe being connected at its other end to the air bottle containing the compressed air supply. A valve 326 in pipe 300 normally remains closed to cut off space 313 from the compressed air supply. The valve 326 is moved to open by a control means comprising the actuating lever 36.

It follows, therefore, that when the valve 326 in the pipe 300 is moved by the actuator lever 36 to its open position, the increase in pressure in the interior space 313 will force the piston element 312 upwardly so that any liquid in the pump casing will be forced outwardly past the outlet valve 317 and thence to the sump S.

On the return stroke of the piston element 310, the discharge valve 317 will automatically reseat itself and at the same time the inlet valve 315 will open to draw in a fresh supply of liquid from the interior of the container 301.

Means may be provided for limiting and thus adjusting the stroke of the piston element 310 and conveniently this takes the form of a threaded plug 318 which registers with a central boss 323 on the inside of the piston. Mounted on the plug 318 is a flexible sealing strip 319 so that the interior of the pressure chamber within the lower skirt, remains sealed irrespective of the movement of the plug 318. 320 indicates a self-locking nut.

Provision is made for fitting a transparent plastic gauge tube 321 to a side wall of the casing 301 to enable the user readily to estimate the quantity of liquid remaining within the container.

When the level of liquid becomes too low, the container 301 may be recharged by removing a filler cap 325, access to which is from the interior of the sump S.

In operation when the control lever 36 is operated to open the valve 326 in the pipe 300, air under pressure passes into the chamber 313 from the air bottle and acts on the lower side of the piston 310 to force it upwardly against the action of the spring 314. The discharge valve 317 is forced from its seating and a regulated amount of liquid from the dispensing chamber passes up the pipe 307 to the outlet duct 309 and from there to the washing chamber. The inlet valve 315 while this operation is taking place, is retained against its seating and thus remains closed to prevent communication between the interior of the pump casing 306 and the interior of the container 301.

The movement of the piston 310 is limited by means of the self-locking nut 320 which, in the extreme position, abuts against the lower side of the end plate 302. A maximum movement of 3/16" is normally allowable.

When the valve 326 in pipe 300 is closed the coil spring 314 acts on the top of the piston 310 to return this to the position shown in FIGURE 14. Downward movement of the piston tends to create a suction within the pump casing which closes the ball valve 317 against its seating, opens the inlet valve 315 and sucks in a further supply of liquid through the opening 322 into the chamber.

A fine mesh gauze filter 327 is positioned across the tank above the dispensing chamber.

Control Mechanism

The present invention is primarily concerned with the valve control mechanism by which the washing unit is charged and emptied of water in timed sequences which entails intermittent operation of the inlet valve 2 and the outlet valve 5 to open and close and vice versa. It should be explained that the amount of water within the chamber 4, the sump S and in circulation through the pump and manifold M connecting the latter to the impeller is not sufficient to fill the washing chamber 4 and in practice does not exceed the capacity of the sump and manifold so that the interior space of the washing chamber remains unobstructed to enable the spray jets from the impeller freely to impinge on the plates or other articles placed within the chamber 4 for washing.

The present invention provides for controlling the operation of the inlet valve 2 by means responsive to the volume as measured by the head of water within the sump S. For this purpose there is provided in the base 13' of the sump S, (FIGURE 4) an opening leading into the chamber 41 provided by the bell-shaped housing or chamber 42, the latter having a threaded spigot 43 by which it is secured in position by a nut 44. Within the bell chamber or housing 42 are vertical guides 45 for a plunger element 46, this plunger element terminating in a skirt 47 of a diameter substantially of a size to enclose the bottom of the housing 42, the annular space between the perimeter of the skirt and the rim of the bell housing being enclosed by a flexible diaphragm 48 which is held in position by means of a circlip 49 entered in an exterior groove in the housing rim.

It will thus be seen, that the water within the sump and the washing chamber 4 has direct access to the interior of the bell chamber 42, so that the pressure due to this head of liquid which in practice will not exceed the depth of the sump S will act directly on the plunger element 46 and cause it to be displaced in its guides 45.

The displacement of the plunger is transmitted to an actuator lever 50, this lever being mounted for pivotal movement about a pivot pin 51 carried by lugs 52 (FIGURES 4 and 5) on the exterior of the bell housing 42. Diametrically opposite the lugs 52 is a second pair of lugs 53 having a pivot 55 for a detent lever 56, which lever 56 co-operates with the actuator lever 50 by means of a roller 57.

It will be seen that the actuator lever 50 is formed at one end with an upstanding arm 58 and it is this arm to which the roller 57 is secured. The roller, when the lever 50 is in its upper, normal or "sump empty" position engages a notch 60 in the detent lever 56. When the parts are in their normal position (which occurs during such time as the unit including container C is being charged with water) the roller 57 rests in the notch 60 and the lower end of the detent lever 56, which is provided with a hook portion 61, is urged to the left, as viewed in FIGURE 4, by a release control spring 62. The spring 62, which is attached to an anchor pin 39 on lever 50, controls the pressure at which the actuator lever 50 will disengage from the detent due to the head of water within the sump S of washing chamber C. This pressure is so adjusted that it balances the pressure transmitted to the actuator lever by the plunger 46 when the required amount of water has entered the sump.

Provision is made to adjust the tension of the spring 62 by means of a threaded adjustment on pin 39 and thus to determine the depth of water to be contained in the sump before the weight of water acting on the plunger 46 will move this into a position to disengage the roller 57 of the actuator 50 from the notch portion 60 of the detent lever 56.

Alternatively, the actuator lever 50 may be magnetically controlled. In one such arrangement the spring actuated detent is replaced by a permanently magnetised element that is attached to the non-pivoted end of the lever 50. This magnetic element co-operates with an armature positioned on the plunger casing and is so arranged that an air gap is present between the armature and the magnetic element, when these are in their engaged position. The force of magnetic attraction between the magnetic element and its armature may be adjusted by increase or decrease in the size of the air gap, the arrangement normally being such that the force of magnetic attraction is just sufficient to balance the pressure transmitted to the actuator lever by the plunger 46 when the required volume of water has entered the sump S. Once this predetermined volume is present the magnetic element will be pulled against the magnetic force of attraction away from the armature when the actuator lever 50 is free to move to carry out the operation as described above.

Opposite the upstanding arm 58 of the actuator lever 50 is a similar upstanding arm 64 which arm is provided with an extension 65, having threaded holes 66 and 67 therein for connection to trip wire connections 80—81 hereinafter described.

Inlet Valve and Starting Control Cam

Control of the inlet valve 2 is by means of a cam 70 (FIGURE 9) termed the inlet cam fastened upon a cam shaft 69 under the control of a manually operable starting knob 68. Knob 68 enables the operator manually to rotate the cam shaft to set the cam mechanism, hereinafter described, into motion to control the operating cycle of the washing machine, a slipping clutch being introduced into the drive to allow this manual rotation. Rotation of cam 70 is in a counterclockwise direction as shown in FIGURES 4, 7, 8 and 9 or, if viewed from a point in front of the control knob 68 (FIGURE 5) in clockwise direction. Also fastened on the cam shaft 69 is a motor control switch cam 110 (see also FIG. 8), hereinafter termed the switch cam, this cam controlling a plunger 112 which on depression by the cam 110 operates an electric switch 111 by which the motor circuit is opened and closed to stop and start the motor. The electric switch 111 is mounted on a bracket plate 114 pivotally attached to chassis plate 38 by means of pivot 40, movement of the bracket 114 in one direction being controlled by cable 81 and spring 81'.

A cam 90 (FIGURE 5) termed the outlet cam with which is associated a cam follower lever 91, controls the opening and closing movements of the outlet valve 5 (FIGURE 1) in the discharge pipe 8.

Assuming that the operator wishes to start up the machine to perform a washing cycle, the starter knob 68 is rotated to turn the cam shaft 69 anticlockwise, when viewed in direction of arrow Y, but which is clockwise when facing in the direction of arrow X. The amount of rotation required in the embodiment illustrated to start the motor is approximately an angle of 8° with the result that the switch cam 110 is turned to disengage the switch operating plunger 112 projecting from the switch 111 from a position 112' (see FIGURE 8a), in which it is in a notch 113 in the cam 110, into which notch the operating plunger 112 falls when the machine is stopped. This displacement of the plunger 112 will close the motor circuit and start up the motor, as the result of which drive is transmitted to the impeller and to the pump although at this time the washing chamber 4 is empty of liquid.

Inlet Valve

The inlet valve (see FIGURES 4 and 10) comprises a body part 72 and a cover plate 72'. The body part has inner and outer concentric walls 211, 211' providing a central outlet passage 9 surrounded by an annular chamber 73. The chamber 73 is in direct communication with the water or other washing liquid supply so that when a valve element conveniently consisting of a membrane 74, which is secured around its periphery by being clamped between the two parts 72, 72' of the casing, is in contact with a seating face 73' on the central wall 211, the inlet valve is closed and water is prevented from passing from the chamber 73 to the central outlet passage 9, leading to the washing chamber.

Membrane 74 has a central opening 205 through which extends a plunger 75, the plunger 75, which is slidably mounted in the casing having a tapered portion 75" which is seated against the central opening 205 when the inlet valve is closed to prevent flow of liquid from the pressure side to the outlet passage 9.

As stated above, the water supply pipe 1 opens into the interior of the chamber 73.

The plunger 75, at one end is formed with an enlarged head 75' which is freely mounted in a recess in the housing 72' while its other end extends through an opening 3' in the casing wall, a water tight seal being obtained by a flexible seal element 200.

On the outer end of plunger 75 is a circumferential slot 76 (FIGURE 4) for engagement with a pin 76' on a lever 77 fulcrumed at 78, this lever, which is the inlet valve control lever, having a projection 79 (FIGURE 9) for co-operation with the inlet cam 70.

Centrally the plunger 75 has a reduced portion 206 so that when the plunger is depressed by the inlet cam 70 as hereinafter described, the part 206 moves into the diaphragm opening 205, the annular gap thus provided enabling the pressure on the reverse side, which assists in retaining the inlet valve, when closed, on its seating 73' to escape. When the inlet valve is closed, passage of liquid from the inlet (via the chamber 73) to the valve to the outlet passage 9 is prevented partly by the valve element including diaphragm 204 and its associated plunger 75 and partly that part 211 of the valve casing which provided the seating for the valve element.

It is desirable to ensure that the opening and closing of the inlet valve will require the minimum of force acting through the plunger 75 and that the membrane 74 shall remain approximately balanced irrespective of the pressure of the water supply.

For this purpose reverse face of the membrane 74 is recessed to receive an annular metal disc 201 (FIGURE 10) which prevents the membrane being deformed into the outlet passage 9 when subjected to substantial water pressure. The membrane 74 may be corrugated as at 202 to provide sufficient flexibility and thus to minimize the force required to move it over its working travel or stroke.

A bleed hole 204 enables the pressure on both sides of the flexible portion of the diaphragm to remain balanced when the valve is closed. Movement of the diaphragm in the direction to open the valve, which is opposite to the direction of arrow N, is limited by the disc 201, abutting against an annular rib 207 in which is a slit 208.

In operation when the inlet valve is closed and the plunger 75 and flexible diaphragm 74 are in the position illustrated in FIGURE 10 the diaphragm 74 is retained in valve closed position against the seating 73' by the inlet water pressure acting through the inlet pipe 1, chamber 73 and bleed hole 204, on to the outside of the metal disc 201 and diaphragm remote from the seating face 73'.

It will be seen that the taper portion 75" of the plunger 75 occupies such a position that it seals the aperture 205. Thus the pressure of the washing liquid supply assists in retaining the inlet valve in closed position.

When the inlet valve is to be opened the plunger 75 is positively displaced by means of the cam 70 operating through the inlet valve control lever 77, which will produce a displacement of plunger 75 in direction opposite to that of arrow N, thus opening up a gap between the plunger and membrane opening 205 to allow water to pass to the opposite side of the membrane. This relieves the pressure acting to retain the membrane 74 against its seating 73' as the outflow area through central opening 205 is greater than the inflow area through the hole 204. Thus the diaphragm 74 is forced off its seating 73' by the pressure of supply water. Water is then free to flow along passage 9 and through the outlet pipe 3 to the washing chamber. It will be noted that the area of the annular gap between the diameters respectively of portion 75" of the plunger and opening 205 is less than the area of the bleed hole 204 but the area of the annulus between the diameter of plunger portion 206 and hole 205 exceeds that of bleed hole 204 thus giving a delayed action effect i.e. the valve does not open until the plunger 75 is near the end of its stroke. It follows therefore that movement of the plunger 75 in one direction i.e. when part 75" is withdrawn from the opening 205 allows the diaphragm to move from its valve closed to open position. Correspondingly, movement of the plunger in the opposite direction, shown by arrow N, causes the diaphragm to move towards the valve closed position.

When the valve is fully open and the disc 201 abuts on rib 207 and since the area of slit 208 is less than the area of the annulus between the diameters of the plunger portions 75" and hole 205, the pressure in the dished portion 209 of the casing 72', which pressure acts to close the valve, is small. Also the main diameter of the dished portion 209 inside rib 207 is larger than the diameter of the central bore 9, the balance of the pressure on the diaphragm thus acts to hold it in the fully open position. The diameter of the bore 9 is greater than the internal diameter of the inlet pipe 1 thus minimising the pressure build-up inside the seal 200.

To close the valve, the plunger 75 is moved in the direction of the arrow Z (FIGURE 4) to block or seal central opening 205 in the flexible diaphragm 74, hence the pressure acting on the diaphragm which tends to close the inlet valve, builds up and causes the diaphragm 74 to move to the closed position abutting against face 73' in unison with the plunger 75.

A click-over device may be provided in the form of a spring arm or blade 115 (FIGURE 4) having a V-shaped end 116 for co-operation with a stop face 117 on the upper end of the lever 77 by which the plunger 75 is moved to open to admit water on operation of the inlet cam 70.

It follows, therefore, that on positive action of the lever 77 to open it will ride under the stop 116 and will be held in the open position by a reverse face 116' until such time that the sump is full and there is sufficient mass of water to displace actuator lever 50 when the latter will drop and thus exert a pull through a cable 80 so as to restore lever 77 to other side of stop 116.

As has been described a movement of the plunger 75 in the direction of the arrow Z (FIGURE 4) will close the inlet valve and this movement is brought about by the cable 80, connected at one end to the plunger 75 and at its other end adjustably connected through a thumb screw 82 to the threaded opening 67 in the extension 65 on the actuator lever 50.

Therefore, a few moments after the motor has started, the rotation of the cam shaft 69 and cam 70 will bring the lobe 71 (see FIGURE 9) into engagement with the projection 79 on the lever 77 which lever by its pin and slot connection 76 with the plunger 75 will move the plunger to open the inlet valve and thus admit water to the chamber C.

As soon as the required amount of water is present in the sump S, the head of water acting through the plunger 46 will overcome the resistance of the spring 62 holding the detent lever 56 and thus cause the V-notch 60 therein to disengage from the roller which allows the actuator lever 50 to drop and rock about its pivot. As a result of this movement, the actuator lever extension 65 through the cable connection 80 will pull the plunger 75 in the direction of the arrow N to close the inlet valve and thus cut off the flow of water to the washing chamber.

Referring now to FIGURE 13, there is shown a modified arrangement of the mechanism for closing and opening the inlet valve 2.

In this construction the plunger 75 operating the valve is pivotally connected at 190 to one arm of a spring biassed two-armed lever 191 having a fulcrum 192 on the casing, the other arm of the lever being connected through a wire cable 193 to the lever 77 under the control of the inlet cam 70. A spring 199 is connected to the lever 191 at its lower end so that the lever will normally assume a position where plunger 75 is withdrawn and the inlet valve is closed.

When the two-armed lever 191 has been actuated by the cam 70 to open the inlet valve to admit water to the chamber, its lower end 197 is moved sufficiently to the right (counterclockwise) where a spring biassed latch 194 pivotally attached at 195 to an extension 196 of casing 72 will move into engagement therewith in which position it is held to retain the valve open. This state of affairs will continue until such time as the actuator lever 50 is returned to its closed position when a cable 198 attached to the latch 194 will disengage it from the lever 191. On release of the lever 191 it will be restored to the inlet valve closed position by means of the spring 199.

Motor Control Switch Mechanism

It will be seen that the actuator lever 50 is also coupled by means of a cable 81 to the bracket plate 114 (see FIGURE 8) on which the motor switch 111 is carried and which bracket 114 is capable of pivotal movement about its fulcrum 40 on the chassis plate 38. On displacement of the actuator lever 50, since it is connected to the bracket plate through the cable 81, it will cause bracket plate 114 carrying the electric switch 111 to move in a counterclockwise direction about its fulcrum 40 causing further movement (depression) of the switch plunger 112, which will be moved from the dotted line position 112″ (FIGURE 8A) to position 112‴.

As previously described, the washing machine is started up by turning the control knob 68 in a counterclockwise direction which turns the cam 110, as shown in FIGURE 8, in the direction of the arrow. This brings the motor switch plunger which, when the machine is switched off, lies in notch 113, opposite one of the parts of the perimeter of the cam where its radius is a maximum and as a result the plunger is depressed and moves from the (motor stop) full line position 112 (FIGURE 8A) to position No. 1 indicated in dotted lines at 112″. This depression of the plunger starts the motor. When the motor starts, the cam 110 begins to revolve in the direction of the arrow (FIGURE 8) and so long as the plunger remains opposite the part of the perimeter of the cam of maximum radius the motor remains switched on. If, before the plunger comes opposite the notch 113, there is a movement of the switch plate 114 such as is produced through the cable 81 when the actuator 50 is displaced on the washing chamber containing the requisite head of liquid, it follows that there will be a further depression of the plunger. This additional movement, which is equal to the depth of the notch 113, moves the plunger to the No. 2 position shown in dotted lines at 112‴. Since the extent of this movement is equal to the depth of notch 113, it follows that when, after further rotation of the cam, the plunger 112 again enters the notch 113 or one of the other depressions 113′ of the cam, its return movement to position 112″, although in the direction for opening switch 111, will not be far enough to open the switch and stop the motor. If, however, sufficient liquid has not entered the sump to cause displacement of the actuator 50, the plunger 112 will, when it comes opposite notch 113, protrude sufficiently to enable it to operate the switch 111 to stop the motor until sufficient water has entered the sump S to cause operation of the actuator.

In practice the length of the cable 81 which has a coil spring 81′ thereon can be so adjusted as to produce a movement of the bracket 114 and thus bodily movement of the switch 111, which is exactly equal to the depth of the notches 113, 113′ in the motor switch cam 110.

The additional notches or depressions 113′ are provided in the switch cam 110 to switch the motor off during washing and rinsing operation, unless the correct amount of water has entered.

Water Heat Control Mechanism

Control of the water heating resistance element 30 is by means of a cam 130 (see FIGURE 7) and an associated lever 131 having a fulcrum 132 and one end of which lever is provided with an adjustable stop 133 for engagement with a projection 134 on the underside of the actuator lever 50, the other end of the lever 131 having an upturned end 135 for engagement with cam 130. An arm 131′ (see FIGURE 5) projects perpendicularly from lever 131 and is adapted to contact heater switch 139 and switch this on by means of an adjustable set screw 131″ when the actuator lever 50 is moved downwardly.

It will be appreciated that since the actuator lever 50 does not move to close the inlet valve until sufficient water has entered the washing chamber, it is impossible for the heating circuit switch to be closed and the heater switched on until there is sufficient water in the washing chamber.

Thus the correct amount of water in the washing unit through the depression of the actuator lever 50 will cause three things to happen.

(1) Water inlet valve 2 shuts.
(2) Motor switch 111 is displaced bodily to a position where it will remain on irrespective of the relative positions of switch plunger 112 and cam 110 so that the motor is kept running.
(3) The water heater is switched on.

It will be appreciated that so long as the motor switch remains closed the motor will revolve and in addition to causing circulation of the water and rotation of the impeller, the cam shaft 69 will continue to revolve.

By suitable positioning of three lobes 136, 137 and 138 on the cam 130, it is possible to effect the return movement and thus control the actuator lever 50 since on engagement of lobe 136, 137 or 138 with end 135 of lever 131, the latter will be moved to restore the actuator 50 to its initial position. It follows that when the desired amount of time has elapsed to secure correct washing (as determined by the speed of rotation of the cam and gear drive thereto, and provided the sump is empty and all the water drained therefrom as hereinafter described) the lobe 137 on the cam 130 will engage the end 135 of the lever 131 so as to return the actuator lever 50 to its normal or "no water" position, where the roller 57 thereon will reenter the notch 60 in the detent lever 56. Simultaneously the movement of the lever 131 will move the switch in the water heater circuit to its open position thus cutting off the heating current.

Draining Operation

The third cam 90 (FIGURES 6 and 7) which is the outlet (discharge) control cam controls the opening and closing of the drain valve 5. Outlet cam 90 co-operates with a lever 91 which is pivotally mounted on a fulcrum 152 on a bracket plate 153 fast on chassis 38. At its lower end the lever 91 is connected by a cable 154 passing through a hole in a guide bracket 155 and connected to the pivoted member 150 carrying a rubber stopper or plug 151 by which the drain is normally closed (see FIGURE 1), the member 150 being spring biased to a position to open the discharge valve and being maintained closed by the cable 154.

It will be seen that the cam 90 has an operative portion 156 which corresponds to the valve closed position, the remaining portion of the cam being of reduced radius as shown at 157 and which corresponds to discharge or drain valve open position. The valve automatically moves to its open position under the action of a spring.

In the operative portion 156 of the perimeter of the cam 90 is a notch 156a which provides a "click in" location and serves to enable the operator to locate the starting position when turning the knob 68 to rotate the cam shaft 69 prior to closing electric switch 111 to start the motor. On rotation of the cam 90 from the position shown in FIGURE 7 when the cam arrives at the shoulder 158 leading into the dwell portion 157 of reduced radius or at shoulders 158', 158'', a projection 159 on the lever 91 will be allowed to move inwardly and thus permit movement of the cable 154 to enable the drain valve to open under the action of its spring.

This state of affairs continues until such time as the projection 159 encounters the rising portion 160 or 160' or 160'' when the discharge valve will be moved to its closed position.

It will be appreciated that a complete revolution of the cams corresponds to a cycle of washing, rinsing and drying operations.

*Dispenser Additive Control Mechanism*

An auxiliary cam 170 (see FIGURE 9) may be provided on the shaft 69 for co-operation with a lever 171 connected by means of a cable 172 to the two-armed lever 36 by which, in the embodiment illustrated in FIG. 1, the plunger 34 of the dispenser nozzle can be depressed to cause an additive, e.g. a detergent to be injected into the washing or rinsing water.

*Remote Operation Control Mechanism*

For convenience of adjustment and maintenance, provision may be made to remove the actuator lever 50 from a position immediately beneath the sump to one adjacent the cam mechanism.

In the arrangement shown in FIGURES 11 and 12 the opening 43 in the bottom of the sump S comprises a neck portion 270 connected by short length of hose 271 to a connecting flange 272 of a separate sump pressure chamber 273.

The pressure chamber 273 conveniently is circular and is formed with a well 274 with a lateral outlet 275 leading to the manifold as described in connection with FIGURES 1 and 4.

In the upper wall of the chamber 273 is a spigot connection 276 to which is connected one end of a length of tubing 277 its other end leading to a second chamber 278 (FIGURE 12) housing a bag 279 of rubber or other flexible material. It will be seen that the chamber 278 has a separate cover plate 278' which rests on the bag 279.

It will be seen that the flange 272 of the chamber 273 has an extension 272' which extends below the level of the outlet pipe 276 thus creating an air pocket 273' above the water level in the chamber 273. A filter F is positioned above the opening 43. When the sump S is full, there will be a rise in pressure in the interior of the pressure chamber 273 due to the head of water, as a result of which the entrapped fluid, e.g. air 273' in the chamber will be subject to a corresponding rise in pressure. This pressure rise is transmitted by the conduit or pipe connection 277 to the extendable bag 279, the movement of the bag 279 or other pressure responsive element being utilized to bring about movement of an actuator lever device 280 corresponding to the actuator lever 50 shown in FIGURES 4 to 9 and by means of which the inlet valve opening and closing mechanism, the motor switch control mechanism and heater switch are actuated. The extension 272' within the chamber 273 projects below the air pocket 273' and into the washing liquid at the bottom of the chamber 273, thus maintaining within the chamber 273 a division between the washing liquid and the air extending as a fluid column from the air pocket 273' through the conduit 277 and into the chamber provided by the bag 279. Accordingly, washing liquid is prevented from entering the bag chamber 279.

In the construction shown in FIGURE 12 the cover plate 278' of pressure chamber 278 is of dished formation so that the bag 279 will conveniently conform to the shape of the chamber and thus provide a central depression to receive the V-shaped end 281 of the actuator lever 280, this lever having a loop 282 and being pivotally mounted by this loop on a bracket 283 attached to the underside of the casing 278.

Any rise of water in the sump S will tend to produce expansion of the bag 279, and in order to control the level of water within the sump S there is provided a form of latch or retaining means by which movement of the bag 279 due to the rise in pressure does not become effective to cause displacement of the lever 281, until the water has reached the desired level.

As an alternative to a mechanically operating latch device, i.e. the detent lever 56 of FIGURE 4, the latch operates magnetically. For this purpose there is provided a permanent magnet 284 and an armature 285 for co-operation therewith. The armature 285 may be attached to an extension 286 of the actuator lever 280 and is so arranged that when the sump is empty and the actuator lever 280 is in normal position with the bag 279 deflated (prior to opening of the inlet valve to admit water to the washing chamber), the armature 285 is in a position adjacent the magnetic element 284.

It will be appreciated, therefore, that when the pressure within the bag 279 is sufficient to overcome the pull exerted by the magnet 284 the armature 285 will be forced upwardly and away from the magnet 284 causing the lever 280 to pivot about its fulcrum 282 and to set into operation, the chain of operations described in connection with FIGURES 4 to 9.

Referring to FIGURES 15 and 16 there is shown a modified version of the valve control mechanism in which the washing unit is charged with water and dispensed additive which is maintained at a required temperature by electric immersion heater, these operations being controlled by a series of cams including the motor start and stop switch cam, inlet valve cam, the dispenser valve cam and the drain valve cam, these cams and their associated mechanisms performing the same functions as those hereinbefore described.

The cam shaft, which is driven through a reduction gear from the electric motor E, is indicated at 69' and has four control cams, parts only of which can be seen in FIGURE 15.

Control of the motor switch, indicated generally at 111' is by a circular cam element having in its perimeter a series of notches 1130 similar to the switch cam 110 shown in FIGURE 8 and by an associated lever 408.

Control of the inlet valve 2 (see FIGURES 4, 5, 9 and 10) is by a rotary cam similar to cam 70 and having three lobes similar to the lobe 71 on the cam 70 for cooperation with a two-armed lever 411 mounted for rocking movement on a fulcrum 413, these movements being transmitted to the inlet valve by a Bowden wire type cable 80'.

Control of the dispenser valve 326, by which liquid is dispensed from the container 301 (see FIGURE 14), is by a two-armed lever 414, this lever 414 being engaged by two lobes 1131 on a third circular cam fastened on cam shaft 69' and being mounted on the same fulcrum 413 as that of the lever 411.

Finally the drain valve 5 (FIGURE 1), which normally remains closed, is actuated to open by a Bowden wire 154' connected to a cam lever 91' also mounted on the common fulcrum 413, this lever 91' engaging shoulders 1158 in a fourth cam similar to the cam 90 (FIGURES 6-7).

As previously described in connection with FIGURES 11–12, for purpose of easy control and adjustment the actuator 402 (FIGURE 15) is operated by a chamber or bellows device similar to that shown in FIGURE 12 and connected to the sump air trap by a pipe line corresponding to pipe line 277 (see also FIG. 11).

The bellows or pressure chamber device 400 comprises a rubber or like flexible diaphragm 279' provided with a thin aluminium cover plate 278', against the upper side of which plate 278', an actuator lever device 402 bears, the lever 402 being pivoted to the washing machine casing at 403 and being formed with a projecting tail 404 and an offset downwardly extending arm 405, to which arm 405 a connecting rod 406 is pivotally attached. An adjustable nut on the other end of the connecting rod abuts against a ball shaped head 407 on a motor switch operating elbow shaped lever 408 which is pivotally anchored at its other end 409 to the casing and is formed between its ends with a projection 410 for engagement with the motor switch cam.

The motor switch 111' which is mounted on a bracket also pivoted at 409 is operated by a push button 112' in engagement with the elbow of the lever 408.

The dispenser valve is indicated at 416 and is placed in a pipe line 417 leading from the dispenser container to the washing chamber manifold or to an air bottle whereby pressure on the water being fed to the washing chamber is transmitted to the valve.

Referring now to FIGURE 18, the dispenser valve comprises a rubber sleeve element 418 having circumferential ribs 419 to encircle the pipe line 417 so as to provide an interior annular chamber which is provided with a circumferential rib 420, the arrangement being such that the entire sleeve element is displaceable axially of the pipe 417 by means of the dispenser valve control lever 414.

As can be seen from FIGURE 15, the bifurcated end 415 of a lever 414 rests in engagement with the upper one of two discs 422, 423, mounted at each end of the valve sleeve 418, the lower disc 423 being supported by a helical return spring 427 which in turn is seated against a bracket 426 on the casing wall. Direct passage of air through the interior of pipe line 417 is prevented by a partition wall 424, dividing the pipe into two blind chambers in each of which are ports 425, 425a and between which in the normal position of the parts, a direct flow of air along the pipe line is prevented. The ports are so positioned that one port or set of ports 425a is open to the atmosphere to ensure the pressure in the pipe line leading to the dispenser container remains at atmospheric pressure.

On rotation of the dispenser valve cam, the lever 414 is displaced by contact of the cam lobes 1131 therewith to an amount sufficient to produce axial movement of the sleeve element downwardly as viewed in FIGURES 15 and 18 so as to cause the two sets of ports 425, 425a to be placed in direct communication with one another through that part of the annular chamber above the rib 420.

It follows that the pressure air is transmitted from the manifold air trap direct to the dispenser to cause operation of the latter to discharge the required additive compound.

In operation on intial movement of the cam shaft 69' when the machine is started by turning the knob 68 (FIGURE 5) the inlet valve cam lever 411 is moved in a counterclockwise direction as seen in FIGURE 15 to open the inlet valve and is then held in this position by one arm 432 of a spring biassed latch lever 430 which is pivoted at 431 to the casing. On the arm 432 is a shoulder 433 which is positioned to engage with an extension 434 at the upper end of the inlet valve lever and by means of which it is held in the open position. On the other arm of the latch lever 430 is a roller 435 which is positioned adjacent to the tail 404 of the actuator lever 402 for engagement thereby as hereinafter described. It will be understood that when a sufficient quantity of water is present in the washing chamber, the pressure in the sump thereof, which is transmitted through the air trap to the bellows 400, will operate to cause a movement of the diaphragm 279' upwardly, thus producing a counterclockwise motion of the actuator lever about the pivot 403.

On one end of the actuator lever is a permanent magnet 440 shrouded by a sleeve 441. The permanent magnet when the actuator lever is in the non-operative position is in engagement with an armature 442 provided with a trip arm, 443 extending beneath the bellows device. Attached to the armature 442 through a hook 445 is a tension spring 444 the other end of which spring is connected to one arm 446 of a two armed stop lever 447, the position of the stop lever being adjustable by means of a screw 448 to vary the tension of the spring 444 resisting the upward thrust of the bellows plate 278', and thus to vary the amount of water present in the washing chamber before the actuator lever commences to move. When the actuator lever 402 moves upwardly due to movement of the bellows 400 the magnet 440 at the end of the actuator lever will lift together with the magnet armature 442 which will move upwardly against the bias of the tension spring 444 until the trip lever 443 strikes the bottom of the bellows casing when the armature will be arrested and tilted to release the magnet, whereupon the actuator lever is free to move to its fully open position. The magnet armature now returns to its normal position by the tension spring 444 until it abuts against a seating 447 formed on the casing. It will be appreciated that the control of the actuator lever by means of the magnet and variable tension spring provides of easy adjustment, since the tilting of the armature away from the magnet requires relatively little force, and the biassing force is not appreciably altered by variation of the strength of the magnetic field between the magnet and its armature.

On counterclockwise movement of the actuator lever the tail 404 thereof strikes the roller 435 at the end of the two armed latch lever 430 and moves this lever to release the inlet valve cam lever 411, allowing this to return to its valve closed position.

At the same time the arm 405 of the actuator lever 402 moves in a counterclockwise direction, causing the motor switch lever 408 to disengage from the motor switch cam by means of the connecting rod 406. This has the effect of depressing the switch push button 12 still further and preventing the motor switch from being switched off, which operation would have happened, due to the engagement of the projection 410 in a notch in the motor switch cam, had there not been sufficient water in the washing chamber to bring about actuation of the actuator lever in the manner first described.

In operation, the nut on rod 406 is so adjusted that it abuts against the end 407 of the lever 408 when the projection or lobe 410 is in the motor stopped position in one of the notches 1130 in the motor switch control cam, and the actuator 402 is in its inoperative position. It follows that when the cam is rotated to start the motor the lobe 410 rides out of the notch onto a part of the cam perimeter of maximum radius so that the switch plunger 112' is depressed to close the switch 111', and also with the result that the end 407 of lever 408 moves out of contact with the end of rod 406. Should a notch 1130 come opposite the lobe 410 before the actuator operates, the lobe will move into the notch and the motor will be switched off, and the end 407 of lever 408 will once again enter into contact with the end of rod 406.

When the actuator 402 operates, the rod 406 will push lever 408 out of contact with the cam and will at the same time cause lever 408 to switch the motor on again. Similarly, if the actuator has operated before the rotation of the cam brings one of the notches 1130 opposite the lobe 410, then the end of rod 406 will not cause the motor switch lever 408 to disengage from the cam, but once again will move into contact with the end 407 of lever 408 so as to prevent the lobe following the cam profile and dropping into the notch.

An over riding control of the motor switch 111' may be provided to ensure that the motor will not start should the door of the washing cabinet have inadvertently been left open. One such arrangement is shown in FIGURES 15 and 17 in which movement of the door to the cabinet to open transfers a pull through a Bowden cable to a bell crank lever which normally holds the motor switch in its inoperative position in such a way that the switch is moved away from the cam lever 408 when the door is open with the result that the push button 112' is allowed to protrude so far that the inward movement imparted to it by the lever 408 when the control knob is turned in an attempt to start the machine will not be sufficient to move it to the position for switching on the motor. The Bowden cable leading from the door is connected to one end 450 of a bell crank lever mounted for pivotal movements on a pin 451 against the action of a biassing spring 452, the arrangement being that the motor switch is held in its operative or normal position when the door is closed, one arm of the spring biased bell crank lever thrusting against a plate 453 on which the motor switch is mounted (see FIGURE 17).

*Sequence of Operation*

Turn control knob about 10° clockwise to "START" position. Motor switch cam follower lobe 410 rides out of "STOP" notch 1130 in switch cam, and depresses switch plunger 112' to close contact and start motor.

The inlet valve lever 411 is displaced by a lobe on cam, and moves inlet valve at rear of washing chamber C to "open" position, via Bowden cable 80'. Inlet valve lever 411 is held in fully open position by latch lever 430. The water entering the washing chamber exerts pressure on entrapped air in the pocket or air trap 273' provided at the bottom of the sump S and connected to the rubber bellows 400 situated below the actuator lever 402 (FIGURE 15) so that the lever 402 is subject to an upward thrust corresponding to the head of water in the sump. As soon as sufficient water has entered the chamber C, the upward thrust of the bellows 400 overcomes the downward pull of the permanent magnet 442 and tension spring 444 acting on the outer end of the lever 402 and the lever moves upward. During its upward stroke this lever trips the inlet valve latch 430, thus allowing the inlet valve to shut.

In the possible event of the inflow of water to the machine being abnormally delayed (e.g. due to an upstairs tap being run while the machine is filling) the motor will stop a few minutes after the inlet valve has opened, and will automatically re-start as soon as sufficient water has, in fact, entered the cabinet. This is obtained by auxiliary notches 1130 in the switch cam which allow the switch plunger 112' to return to the "contact open" position unless sufficient water has entered to move the actuator lever upwards which causes the switch lever to be held out of the cam notches.

What I claim is:

1. A washing machine comprising a washing chamber; an inlet to said washing chamber for connection with a washing liquid supply and provided with an inlet valve biased normally to its closed position to control admission of liquid to said washing chamber; a liquid discharge outlet; a valve for controlling the discharge of liquid through said outlet; a spraying device within the washing chamber; power operated means for operating the spraying device; mechanical means operative on starting the power operated means for opening the inlet valve to admit liquid to the washing chamber; a latch device for holding said mechanical means in its inlet valve opening position; means providing a first pressure chamber subjected to the static head pressure of liquid in said washing chamber; means within said first pressure chamber for maintaining a division between the washing liquid therein and another fluid entrapped within said first pressure chamber; means providing a second pressure chamber separate from and remotely situated relatively to said first pressure chamber and having a pressure operable element movable in response to pressure in said second pressure chamber; a fluid pressure transmission tube connecting said first and second pressure chambers for transmitting pressure through a column of said other fluid extending from the entrapped other fluid containing divided portion of said first pressure chamber to said second pressure chamber; an actuator operable by said pressure operable element for releasing said latch device in response to attainment of a predetermined liquid level in said washing chamber and consequent predetermined static pressure of said other fluid in said first pressure chamber, said tube and said second pressure chamber; and a quick release restraining device for restraining displacement of said actuator until attainment of said predetermined static pressure, whereby to effect sudden and certain releasing of said latch device.

2. A washing machine according to claim 1, in which the mechanical means for opening the inlet valve comprises a shaft driven by said power operated means; means including a lever for operating said inlet valve from closed to open position; and a cam on said shaft for operating said lever.

3. A washing machine according to claim 1, in which said quick release restraining device comprises two members, namely a magnet and an armature, one of said members being on said actuator for movement therewith and the other of said members being connected to a part fixed with respect to said washing chamber, said restraining device holding said actuator against effective movement during progressive building up of pressure due to rising of the level of washing liquid in said washing chamber, said restraining device releasing said actuator for effective operating movement thereof only when said predetermined static pressure in said second pressure chamber has been established due to attainment of said predetermined liquid level in said washing chamber and the pressure thereby applied to said pressure responsive element and the force exerted on said actuator is sufficient suddenly to separate said one of said members from said other of said members.

4. A washing machine according to claim 3, including a spring interposed between and connected to said other of said members and said part fixed with respect to said washing chamber whereby to permit limited movement of said actuator, less than sufficient to release said latch device, prior to the sudden separation of said other of said members from said one of said members.

5. A washing machine according to claim 4, in which said magnet is attached to said actuator and said armature is connected to said spring.

6. A washing machine according to claim 4, further including trip means connected to said other of said members and being engageable with a part fixed with respect to said washing chamber toward the end of said limited movement of said actuator, whereby to assist in separating said other of said members from said one of said members.

7. A washing machine according to claim 6, in which said trip means is tippable on engaging said fixed part whereby to cant said other of said members.

8. A washing machine according to claim 1, further comprising a container for a washing liquid additive; dispensing means for feeding additive from said container to the washing liquid; fluid pressure operable means for actuating said dispensing means; and control means operable by said power operated means for periodically effecting application of fluid pressure to said fluid pressure operable means.

9. A washing machine according to claim 1, in which said power operated means comprises a pump which draws off liquid from said washing chamber and feeds it to said spraying device; and an electric motor operatively connected to said pump, said machine further including a switch for starting and stopping said motor; a shaft; means drivingly coupling said motor to said shaft including a clutch permitting angular displacement of said shaft in the direction of driving relative to said motor; a cam on said shaft for operating said switch; and a control handle on said shaft operable for displacing said shaft in its direction of rotation by said motor, as permitted by said clutch, for causing said cam to operate said switch to start said motor.

10. A washing machine according to claim 9, comprising means mounting said start and stop switch for movement relative to said switch cam; and means operable by said pressure operable means for moving said switch relatively to said switch cam for maintaining said switch closed irrespective of the angular position of said switch cam.

11. A washing machine according to claim 10, in which said switch cam has a plurality of notches engageable by said switch for effecting opening of said switch at any of a corresponding number of times during rotation of said switch cam when said switch has not been moved by said pressure operable means.

12. A washing machine according to claim 1, including an electric resistance element for heating washing liquid in said washing chamber; a heater control switch; and means operated in response to pressure of the washing liquid for closing said heater control switch.

13. A washing machine according to claim 1, in which said restraining device comprises two interengaging coupling members, one attached to said actuator and the other yieldably loaded in a direction opposing operational movement of said actuator, in combination with decoupling means operable for effecting disengagement of said two members with a quick decisive action when a predetermined displacement of said actuator has taken place, whereby to permit unrestrained further movement of said actuator for releasing said latch device.

References Cited in the file of this patent

UNITED STATES PATENTS

| | | |
|---|---|---|
| 2,142,928 | Walker | Jan. 3, 1939 |
| 2,195,615 | Chamberlin et al. | Apr. 2, 1940 |
| 2,254,269 | Clark et al. | Sept. 2, 1941 |
| 2,302,923 | Zimarik | Nov. 24, 1942 |
| 2,305,154 | Gilbert | Dec. 15, 1942 |
| 2,548,651 | Chace et al. | Apr. 10, 1951 |
| 2,548,940 | Brotman | Apr. 17, 1951 |
| 2,651,190 | Horvath | Sept. 8, 1953 |
| 2,734,520 | Abresch et al. | Feb. 14, 1956 |
| 2,778,212 | Dayton et al. | Jan. 22, 1957 |
| 2,885,879 | Bloom | May 12, 1959 |